United States Patent

Lecoanet et al.

[15] 3,692,950

[45] Sept. 19, 1972

[54] SYSTEM FOR RECORDING AND CONNECTING WAITING CALLS ON A CHRONOLOGICAL BASIS

[72] Inventors: Roland S. Lecoanet, Saint-Germain-les-Arpajon; Jean A. H. Lepagnol, Chatillon, both of France

[73] Assignee: International Standard Electric Corporation, New York, N.Y.

[22] Filed: Sept. 15, 1970

[21] Appl. No.: 72,271

[52] U.S. Cl. ....................179/27 D
[51] Int. Cl. ....................H04q 3/66
[58] Field of Search ....................179/27 D

[56] References Cited

UNITED STATES PATENTS

| | | | |
|---|---|---|---|
| 2,757,240 | 7/1956 | Gatzert | 179/27 D |
| 3,334,191 | 8/1967 | Arseneau et al. | 179/27 D |

*Primary Examiner*—William C. Cooper
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A circuit is provided for connecting calls in chronological order so that those which have been waiting longest are connected first. A first counter determines and indicates waiting calls according to classes of waiting time and current waiting time for incoming calls. A second counter provides information on waiting time classes being afforded service. The second counter steps once when all calls of a class have been served. New calls are stored in a class by the first counter and the two counters are interconnected so that when the signals from the counters coincide a call stored in the first counter can be connected.

4 Claims, 1 Drawing Figure

PATENTED SEP 19 1972 3,692,950
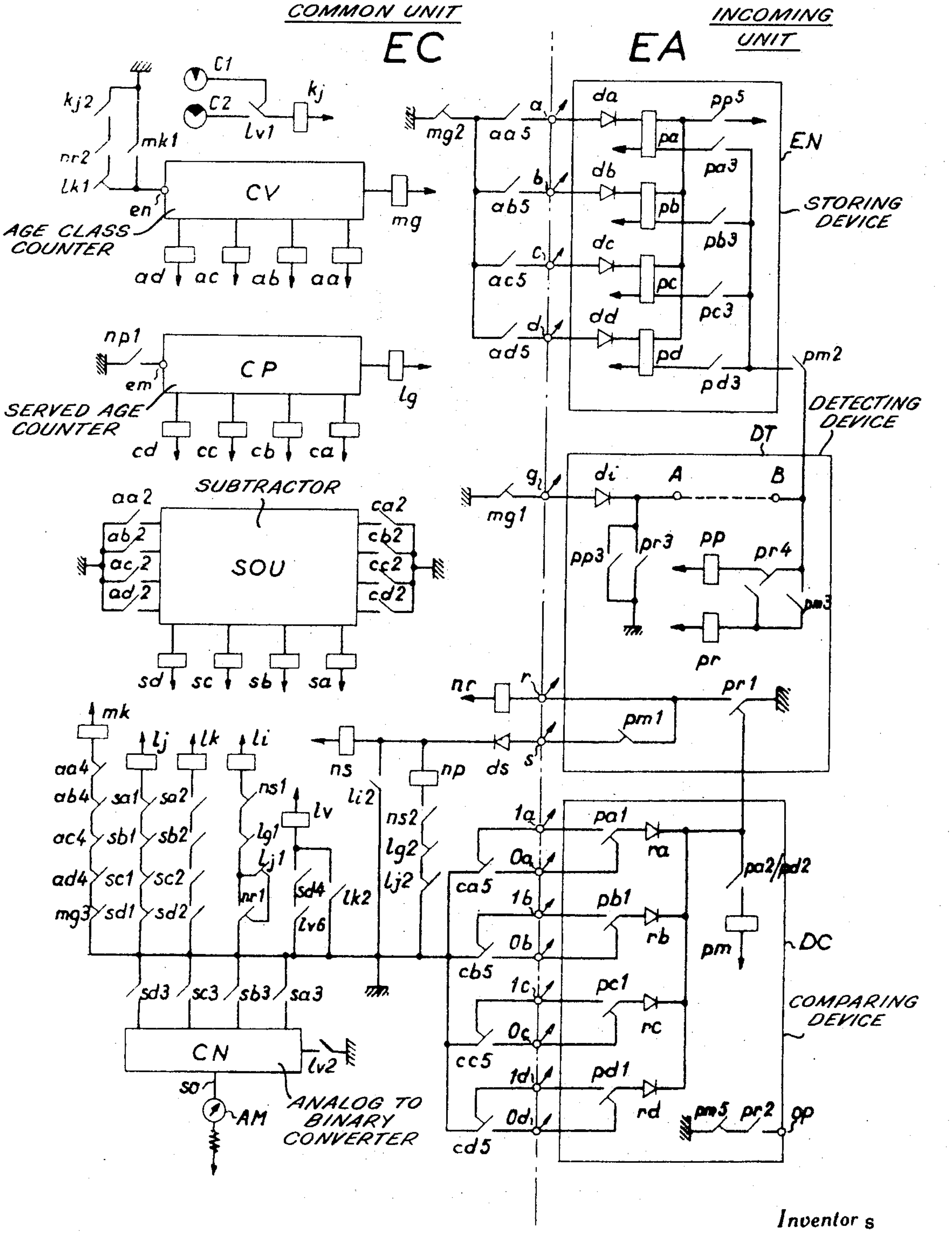
Inventors
R.S. LECOANET &
J.A.H. LEPAGNOL
By D.D. Warner
Attorney

SYSTEM FOR RECORDING AND CONNECTING WAITING CALLS ON A CHRONOLOGICAL BASIS

The present invention concerns a waiting calls chronological classification system and more particularly a system enabling the classification of calls with the purpose of handling them then in the order they each originated. The invention is applicable mainly, though not exclusively, to semi-automatic or manual exchanges.

Indeed, in telephone exchanges wherein calls are being put through by operators it is not possible to avoid, at peak hours, a certain waiting for calls. Since the operators are all very busy, the calls will accumulate. As soon as an operator is free, she will handle one of the waiting calls. If the handled call is taken at random, out of all the waiting calls, some of these latter will be waiting a long time while others may be handled almost immediately. It is of course preferable that the calls be handled in the same order as they come in. This, however, will require means for classifying calls according to order of arrival, for identifying the callers in chronological sequence and for signalling the callers in the same sequence.

The present invention concerns therefore a classification system for waiting calls according to which, inside a common unit, a first counter will be stepped regularly, as long as there is at least one waiting call, so as to determine age classes and to provide corresponding age indications. These first indications may be called current age indications. A second counter (priority counter) will designate the successive age classes to be handled in priority and will, to that end, provide age indications. These second indications may be called served age indications. It will step on when all the calls of one age class have been handled. Inside every incoming unit a circuit detects the incoming of a call and controls the storing of the current age indication furnished at that instant. This stored age indication is constantly compared with the served age indication. When these two indications are identical, the call will be signalled with the purpose of it being handled. Thus is provided the same age indication to all the calls originating during the same age class. When the priority counter gives the priority to an age class, the calls forming part of that class are all signalled in the same time, and are served at random. This system thus enables storing a large number of waiting calls through adjustment of the duration of the age classes. On the other hand, it affords the advantage of making extensions possible at lowest cost.

Different other features of the invention will become apparent from the description that follows, given by way of non-limiting example in conjunction with the accompanying FIGURE which represents the diagram of a waiting calls classification system realized according to the present invention.

This diagram comprises the circuits of an incoming unit EA and the circuits of a common unit EC. The multipling arrows between these two units show that several incoming units such as EA are connected in parallel to the common unit EC.

The different circuits are realized by means of relays, contacts and diodes. A relay is illustrated in the FIGURE by a rectangle bearing, on either side, the connections of one or of two windings. It bears as reference two small letters. According to the detached contact representation, the contacts controlled by a relay are positioned anywhere on the diagram. They bear the reference of the relay followed by a digit. The reference *pp*5, for instance, designates the contact of rank 5 of the relay *pp*. Moreover, the various circuits are current supplied by the same DC current source, say a battery for instance, the positive terminal of which is earthed. The circuits leading to the negative terminal are ended by an arrow.

The incoming unit EA comprises a detecting device DT, a storing device EN and a comparing device DC. This incoming unit is associated with a telephone circuit, not shown in the FIGURE, at the input of a semi-automatic telephone exchange through which operators answer the calls.

A circuit A–B shown in dotted line, is established, through means not shown in the FIGURE, when a call is received on the telephone circuit. It stays established as long as the call is not handled. It is then cut, through means not shown in the FIGURE, when the telephone circuit is connected to an operator's station.

The common unit EC comprises mainly : a time scale, in the form of a counter CV, determining age classes, providing corresponding current age indications and stepping under the control of a relay *kj*, this latter being itself controlled by cams C1 or C2 ; a counter CP, providing served age indications ; and a subtractor SOU providing the difference between the positions of the counters CV and CP. The counter CV, the counter CP and the subtractor SOU are four bits binary units. They each control four output relays. For instance, when the counter CV is in position 0001, the relay *aa* is energized and the relays *ab* to *ad* are in rest condition; when it is in position 0010, the relay *ab* is energized and the relays *aa*, *ac*, *ad* are in rest condition, and so on. The counter CV has 15 effective positions and provides 15 different age indications, position 0000 not being used. It steps from one position to the next one upon the front edge of an impulse (earth) applied to its inlet *en*. Moreover, the relay *mg* energizes at the beginning of the earth impulse and releases when the counter has changed position. Such a counter is well known in the art and can be designed in different ways. The operation of the counter CP is identical to the one of counter CV. The subtractor SOU receives the position of the counters CV and CP through contacts *aa*2/*ad*2 and *ca*2/*cd*2. It displays, on relays *sa*/*sd*, the difference between the positions of counters CV and CP. For instance, if the counter CV is in position 0100 (relay *ac* energized, and *aa*, *ab*, *ad* in rest condition) and if the counter CP is in position 0001 (relay *ca* energized and *cb* to *cd* in rest condition), the subtractor displays the difference 0011. The relays *sa* and *sb* are energized and the relays *sc* and *sd* are in rest condition.

It will be assumed that initially no call is in waiting condition. In the incoming unit EA all the relays are in rest condition. It is the same in all the other incoming units. In the common unit EC, the counters CV and CP are both in the same position, say 0100 for instance. The relays *ac* and *cc* are energized. The contact *ac*5 marks with an earth the wire *c*, and this displays the current age indication onto the incoming units. Contact *cc*5 switches the earth connection from wire 1*c* onto wire 0*c* ; and this displays the served age indication.

On the other hand, the subtractor SOU, which receives two equal values, leaves the relays *sa/sd* in their rest condition. Therefore, relay *lj* is energized.

Finally, relay *kj*, connected to cam C1, energizes periodically ; but its contact *kj*2 is without any effect because of opening of contact *nr*2.

It will now be assumed that an isolated call is received in the incoming unit EA. When the call originates on the telephone circuit, with which is associated the incoming unit EA, the circuit AB is established. Relay *pp* of the device DT energizes through the following circuit : battery, relay *pp*, contact *pr*4, circuit AB, diode *di*, wire *g*, contact *mg*1 and earth in the common unit EC. The contact *pp*3 closes and provides a holding earth potential to the relay *pp*. The contact *pp*5 closes. The relay *pc* energizes through : battery, contact *pp*5, upper winding of relay *pc*, diode *dc*, wire *c*, contact *ac*5, contact *mg*2, earth. Thus, the relays *pa/pd* store the current age indication 0100 displayed on wires *a/d*. The diodes *da/dd* ensure the decoupling of the various incoming units multipled along wires *a/d*.

Since relay *pc* energizes, the contact *pc*2 closes. Relay *pm* of the comparing device DC energizes through the contacts *pc*2 and *pr*1 thus indicating that a current age indication has been stored into the unit EA. Contact *pc*1 operates and connects the wire 1*c* to relay *pm* by means of diode *rc* and contact *pc*2. The other contacts *pa*1, *pb*1, *pd*1 remain in rest condition and connect the wires 0*a*, 0*b*, 0*d* to the relay *pm*. The contact *pm*2 closes and enables holding relay *pc*. Contact *pm*3 closes; the relay *pr* energizes. Contact *pr*4 operates. It enables, on the one hand, the holding of relay *pr* and controls, on the other hand, the release of relay *pp*. Contact *pr*1 operates and applies an earth potential along wire *r* onto the common unit EC in order to signal that a call is waiting. The relay *nr* energizes.

Moreover, the operation of contact *pr*1 leaves relay *pm* under the dependence only of the comparing circuit comprising mainly contacts *ca*5/*cd*5 and *pa*1/*pd*1. If the first element of the current age indication stored in EA (contact *pa*1) is identical to the corresponding element of the served age indication displayed by EC (contact *ca*5) the contacts *pa*1 and *ca*5 are either in the positions shown in the FIGURE, or in the reverse positions and, in both cases, the relay *pm* does not receive any earth potential through that path. Whereas it receives one if these elements are different; and this earth potential holds it in operation. Same applies for the other three elements of the compared age indications. Finally, if there is a whatever difference between the compared age indications, the relay *pm* receives an earth potential and remains energized; if they are identical, the relay *pm* releases.

The diodes *ra/rd* have a decoupling function, like the diodes *da/dd*.

In the instance considered here, since the counters CV and CP were supposed being in the same position, the stored age indication is identical to the served age indication and the relay *pm* releases as soon as contact *pr*1 operates. The call received by unit EA is thus designated for being handled. To that end, an earth potential is transmitted along the wire OP through the contacts *pm*5 and *pr*2.

Moreover, opening of contact *pm*2 breaks the holding circuit of relays *pa/pd* which all restore to rest condition. The stored current age indication is removed. In the unit EA, only relay *pr* remains energized, held by *pr*3 and *pr*4. It will release when the call is put through ; the link A–B being then broken.

Finally, since the contact *pm*1 closes, an earth is applied along wire *s*. Relay *ns* energizes, in the common unit EC, and this is without any effect at that instant.

Now it will be assumed that the call received by unit EA is not immediately served (no operator is available) ; and the operation of the unit EC will be described. It is reminded here that in the unit EC, consequently, relay *nr* is energized.

First will be described the operation of the counter CV. When the relay *kj* energizes, under the control of cam C1, contacts *nr*2 and *lk*1 being closed, the contact *kj*2 applies an earth potential to the inlet *en* of counter CV. The relay *mg* energizes. The contact *mg*2 opens and removes the earth potential from the wire *c*, so as to cancel the displayed current age indication which is going to change. The counter CV steps into position 0101; the relays *aa*, *ac* are then energized and the relays *ab*, *ad* are in rest condition. The contacts *aa*5 and *ac*5 close. When contact *kj*2 opens, and cancels the earth potential from upon inlet *en*, the relay *mg* releases. Contact *mg*2 closes and provides an earth potential which is transmitted along wires *a* and *c*. The age indication 0101 is thus displayed along the wires *a/d*. If a call originates, the calling incoming unit will store the age indication 0101. As long as at least one waiting call exists (relay *nr* energized) the counter CV will thus keep stepping at regular intervals, at the rhythm of the cam C1, at the rate of one step per impulse transmitted on its inlet *en* through contacts *kj*2, *nr*2 and *lk*1.

It will be assumed that a second call originates when the age indication 0110 is displayed along the wires *a/d*. The calling incoming unit (such as a unit $EA^x$ not shown in the FIGURE and identical to unit EA) stores this age indication.

On the other hand, as soon as the position of the counter CV differs from the one of counter CP, the subtractor SOU displays the difference. One or several relays *sa/sd* energize according to the value of that difference. The relay *lj* releases. The contact *lj*2 closes, preparing the energizing of relay *np*.

It is worth noting that when counter CV has reached position 0000 and that the relay *mg* is released, the relays *aa/ad* are in rest condition. The contacts *aa*4 . . . *ad*4, *mg*3 are closed. The relay *mk* energizes. The contact *mk*1 closes and applies an earth to the inlet *en* of counter CV. This latter thus passes into the next position (position 0001). The relay *mg* energizes. Contact *mg*3 opens and causes the release of relay *mk*. Contact *mk*1 opens and removes the earth potential from upon inlet *en* of contact CV ; the relay *mg* releases. It is seen therefore that the counter CV reaching position 0000 automatically passes onto position 0001, even if no call is waiting. Position 0000 (which does not enable energizing any of the relays *pa/pd* in an incoming unit such as EA) is thus removed from the utilized age classes.

It will now be assumed that the first waiting call is handled by the operator. The circuit AB (in the unit EA) is interrupted by means not shown in the FIGURE. Relay *pr* releases and removes the earth potential from upon wire *s*. The incoming unit EA is again in its rest condition.

At removal of the earth potential from upon wire *s*, the short-circuit of relay *np* is open. This relay energizes in series with the relay *ns* which holds.

Contact *np*1 closes and applies an earth potential to the inlet *em* of counter CV. Counter CP steps one step and reaches position 0101, wherein the relays *ca* and *cc* are energized. Relay *lg* energizes. Contact *lg*2 opens and breaks the holding circuit of relays *ns* and *np* which release. Contact *np*1 opens and removes the earth potential at the input *em* of the counter CP. Relay *lg* releases. Contact *lg*1 closes. Relay *li* energizes through contacts *ns*1, *lg*1 and *nr*1. Contact *li*2 closes and controls the energizing of relay *ns*. Contact *ns*2 closes and prepares the holding of relay *ns* and the energizing of relay *np*. Contact *ns*1 opens and controls the release of relay *li*. At opening of contact *li*2, the short-circuit of relay *np* is open and this relay energizes in series with relay *ns* which holds. As previously described, above, the contact *np*1 closes and controls the stepping into the next position of counter CP which passes onto position 0110 wherein the relays *cb* and *cc* are energized.

On the other hand, contacts *ca*5/*cd*5 apply the earth potential along wires 1*a*, 0*b*, 0*c*, 1*d*. Now relay *pm* of the comparing device DC of second calling incoming unit $EA^x$ is connected to the wires 0*a*, 1*b*, 1*c* and 0*d* through contacts such as *pa*1/*pd*1. That anti-coincidence deprives this relay *pm* of any holding circuit. It releases.

The unit $EA^x$ is thus designated for being connected to an operator's position, in the same manner as the unit EA. As from this instant, because of release of its relay *pm*, the unit $EA^x$ applies an earth potential along wire *s*. This earth potential holds the relay *ns* energizing, in the common unit EC, in order to interrupt the operation of the counter CP. Whereas relay *np* can release.

Finally, when the call from unit $EA^x$ has been handled and that there are no more waiting calls, the common unit EC does not receive any longer the earth potential along the wire *r*. Relay *nr* releases. Contact *nr*1 restores to rest condition. Counters CV and CP being in different positions, the subtractor SOU provides an information different from 0000. One or several relays *sa*/*sd* are energized. Relay *lj* is therefore not energized. Relay *li* energizes through contacts *ns*1, *lg*1, *lj*1 and *nr*1. Contact *li*2 closes and controls the energizing of relay *ns*. Then, as described above, the relay *li* releases ; relay *np* energizes ; relay *lg* energizes ; counter CP steps one step ; relays *ns* and *np* release ; relay *li* re-energizes; and so on until the counter CP reaches the same position as counter CV. Subtractor SOU then provides the indication 0000. The relays *sa*/*sd* all restore to rest condition. Contacts *sa*1/*sd*1 close. Relay *lj* energizes and breaks, through opening of contact *lj*1, the energizing circuit of relay *li*. Counter CP remains in the position it happens to be in. Thus, counter CP was set in the same position as counter CV in order to avoid losing time when next call originates. It is worth noting that diode *ds* prevents the return of the earth potential, provided by the contact *li*2, onto the relay *nr*, and prevents the energizing of this latter when no call is waiting.

In all the foregoing explanations the case was considered where in an age class there is only one call waiting. If there are several, the calling incoming units will all receive the same current age indication. When counter CP displays along wires 1*a* to 0*d* a served age indication, identical to that current age indication, the relay *pm* of each calling unit, belonging to the considered age class, will release. These units apply each an earth potential along wire *s*, and this has for result to stop the counter CP. Each of them applies also an earth potential along wire *op*. Through means not shown in the FIGURE, they are handled the ones after the others in a whatever order. For each call handled, the relays *pa*/*pd* and then *pr*, of the corresponding incoming unit, release. When the operator handles the last call of the age class, the earth potential from upon wire *s* is removed, enabling the energizing of relay np in series with the relay *ns* which holds, so as to control the stepping of counter CP.

The system of the present invention moreover enables indicating to the operator the age of the oldest call. To that end, the subtractor receives on its left part, through contacts *aa*2/*ad*2, the current age indication provided by the counter CV and, on its right part, through contacts *ca*2/*cd*2, an indication giving the position of counter CP. Subtractor SOU makes the difference of these two indications and displays it in binary form, through the energizing of relays *sa*/*sd*. For a difference, say for instance of 0011, the relays *sa* and *sb* are energized, the others remain in rest condition. Contacts *sa*3 and *sb*3 close and provide an earth potential onto an analogical-binary converter CN. This latter also receives an earth potential provided, possibly, by contact *lv*2 and which signals the stepping rate of counter CV. It provides in exchange, on its outlet *so*, an analogical signal which, displayed by an analogical measuring unit AM (shown in the form of a galvanometer), provides an indication of the approximate waiting duration of the oldest call.

Finally, it is worth considering the case where, because of the number of waiting calls and their handling time, the waiting of the oldest call reaches the duration of one cycle of counter CV. In this case, counter CP takes up such a delay that the counter CV chances to overpass it ; this is to be forbidden in order to avoid a fully wrong order of priority of the calls. When position of counter CV is lower, by only one unit, than position of counter CP, their difference is equal to 1111. All the relays *sa*/*sd* are therefore energized. Contacts *sa*2/*sd*2 are closed. Relay *lk* energizes. Contact *lk*1 opens, forbidding the application of earth impulses onto inlet *en* of counter CV so as to block its stepping. Contact *lk*2 closes and controls the energizing of relay *lv* which holds through contacts *lv*6 and *sd*4. Contact *lv*1 operates and connects relay *kj* to cam C2 instead of cam C1. Cam C2 has an operating rate lower than that of cam C1. Relay *kj* then energizes at a slower rate. When counter CP steps by one step, the difference between the positions of counters CV and CP becomes again different from 1111. More exactly, it takes the value 1110. Relay *sa* releases. Contact *sa*2 opens. Relay *lk* releases. Contact *lk*1 re-establishes the control circuit of counter CV. Counter CV steps at the new operation rate of relay *kj*, that is to say at the rate of cam C2. The age classes are therefore enlarged, and this will enable storing more waiting calls. Counter CV continues operating at this rate until the difference between its position and that of counter CP be lower than 1000. When this difference diminishes until it becomes equal to 0111, the relay *sd* releases. Contact *sd*4 opens. Relay *lv* releases. Contact *lv*1 restores to rest condition and the relay *kj* is again connected to cam C1, enabling counter CV to resume its prior operating condition.

The system of the present invention has therefore enabled grouping the waiting calls into age classes, and to handle them by starting with the oldest class. Moreover, it enables in case of congestion to increase the duration of the age classes so as to be able to set more calls into waiting condition.

On the other hand, the capacity of the system of present invention can easily be increased at very little cost. In order to double for instance the capacity, it is merely necessary to add on a stage to each device in the present system (counter CV, counter CP, device EN, etc.).

It is understood the foregoing descriptions were given by way of non-limiting example, and other embodiments are liable to be considered without necessarily being out of the scope of present invention. Numerical examples are given only to facilitate the description and may vary with every application of present invention.

We claim:

1. A chronological classification system for waiting calls utilizable in semi-automatic switching systems comprising: a plurality of incoming units, each including a call detecting circuit, an age indication storing device and a comparing device; a common unit including a first counter and first storage means coupled to said counter for indicating age classes and providing corresponding current age indications intended for incoming units; said common unit including a second counter and second storage means coupled to said second counter for providing served age indications designating age classes to be handled by operators; control means causing the first counter to step at regular intervals in order to determine current age classes of equal duration; a call detecting circuit of an incoming unit detecting calls originating in the unit; means in the unit for controlling the storing, into the first storage means of the current age indication provided at that very instant by the first counter of the common unit; a comparing device coupled to compare the indications of age classes in said first storage means with the served age indication provided by the second storage means and providing, when these two indications become identical, a signal requesting that the considered call be handled; the second counter stepping by one step when the age class it indicates does not encompass any waiting call, so as to give the highest priority to the calls of the next class; this system thus enabling grouping the calls into age classes and designating the calls belonging to the oldest age class so that these calls may be handled in priority.

2. The system as claimed in claim 1, in which the first counter of the common unit is set into operation only when a call is detected in an incoming unit and stays operating as long as there exists at least one waiting call, thus affording economy in its use.

3. The system as claimed in claim 1, in which the comparing device includes a subtractor making it possible to calculate the difference in positions of the two counters, and, stop means operating when this difference reaches the duration of a cycle of the second counter, that is to say when the first counter catches up to the second counter, and then blocking the stepping of the first counter, in order to avoid assigning the same age indication to calls detected at different instants.

4. The system as claimed in claim 3, in which a switching circuit controlled by the stop means enables slowing the stepping rate of the first counter when this latter catches up to the second counter, and this enables increasing the duration of each age class, and thus, increasing the capacity of the call classifying system.

* * * * *